(12) United States Patent
Mazyar et al.

(10) Patent No.: US 9,404,030 B2
(45) Date of Patent: Aug. 2, 2016

(54) SWELLABLE ARTICLE

(75) Inventors: Oleg A. Mazyar, Houston, TX (US);
James E. Goodson, Porter, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 769 days.

(21) Appl. No.: 13/585,160

(22) Filed: Aug. 14, 2012

(65) Prior Publication Data

US 2014/0051612 A1 Feb. 20, 2014

(51) Int. Cl.
*C09K 8/50* (2006.01)
*C09K 8/03* (2006.01)
*C09K 8/516* (2006.01)
*E21B 33/12* (2006.01)

(52) U.S. Cl.
CPC ... *C09K 8/50* (2013.01); *C09K 8/03* (2013.01); *C09K 8/516* (2013.01); *E21B 33/1208* (2013.01)

(58) Field of Classification Search
None
See application file for complete search history.

(56) References Cited

U.S. PATENT DOCUMENTS

| 7,071,258 | B1* | 7/2006 | Jang | B82Y 30/00 423/445 B |
| 7,479,513 | B2* | 1/2009 | Reinheimer et al. | 523/179 |
| 2009/0084550 | A1 | 4/2009 | Korte et al. | |
| 2009/0131563 | A1* | 5/2009 | Wang | C08B 31/00 524/96 |
| 2011/0098202 | A1* | 4/2011 | James et al. | 507/225 |
| 2011/0275743 | A1* | 11/2011 | Ishii et al. | 524/106 |
| 2013/0137054 | A1* | 5/2013 | Jiang | C08L 51/10 432/4 |

OTHER PUBLICATIONS

Lo et al., Microfluidic Actuators Based on Infrared-Light Responsive Pnipaam Hydrogel Nanocomposite Incorporating Graphene-Oxide, 2011 16th International Solid-State Sensors, Actuators and Microsystems Conference (Transducers), Beijing, China, Jun. 5-9, 2011, pp. 2430-2433.*
Alzari et al., Graphene-containing thermoresponsive nanocomposite hydrogels of poly(N-isopropylacrylamide) prepared by frontal polymerization, Journal of Materials Chemistry, vol. 21, May 10, 2011, pp. 8727-8733.*
Alexander A. Green et al., "Emerging Methods for Producing Monodisperse Graphene Dispersions," The Journal of Physical Chemistry Letters, Jan. 21, 2010, vol. 1, No. 2, pp. 544-549.
D. D. L. Chung, "Review Exfoliation of graphite," Journal of Materials Science 22 (1987), pp. 4190-4198.
V. Smuleac et al., "Polythiol-functionalized alumina membranes for mercury capture," Journal of Membrane Science 251 (2005), pp. 169-178.
Wei Gao et al., "Engineered Graphite Oxide Materials for Application in Water Purification," ACS Appl. Interfaces 2011, 3, pp. 1821-1826.

* cited by examiner

*Primary Examiner* — Jeffrey Washville
(74) *Attorney, Agent, or Firm* — Cantor Colburn LLP

(57) ABSTRACT

A swellable article, including a matrix material and an exfoliatable graphene-based material disposed in the matrix material. The exfoliatable graphene-based material is operatively arranged to facilitate swelling of the swellable article upon exposure to a selected fluid by sorbing particles in the fluid. The swelling enables the swellable article to engage an adjacent structure. Methods of making and using a swellable article are also included.

31 Claims, 1 Drawing Sheet

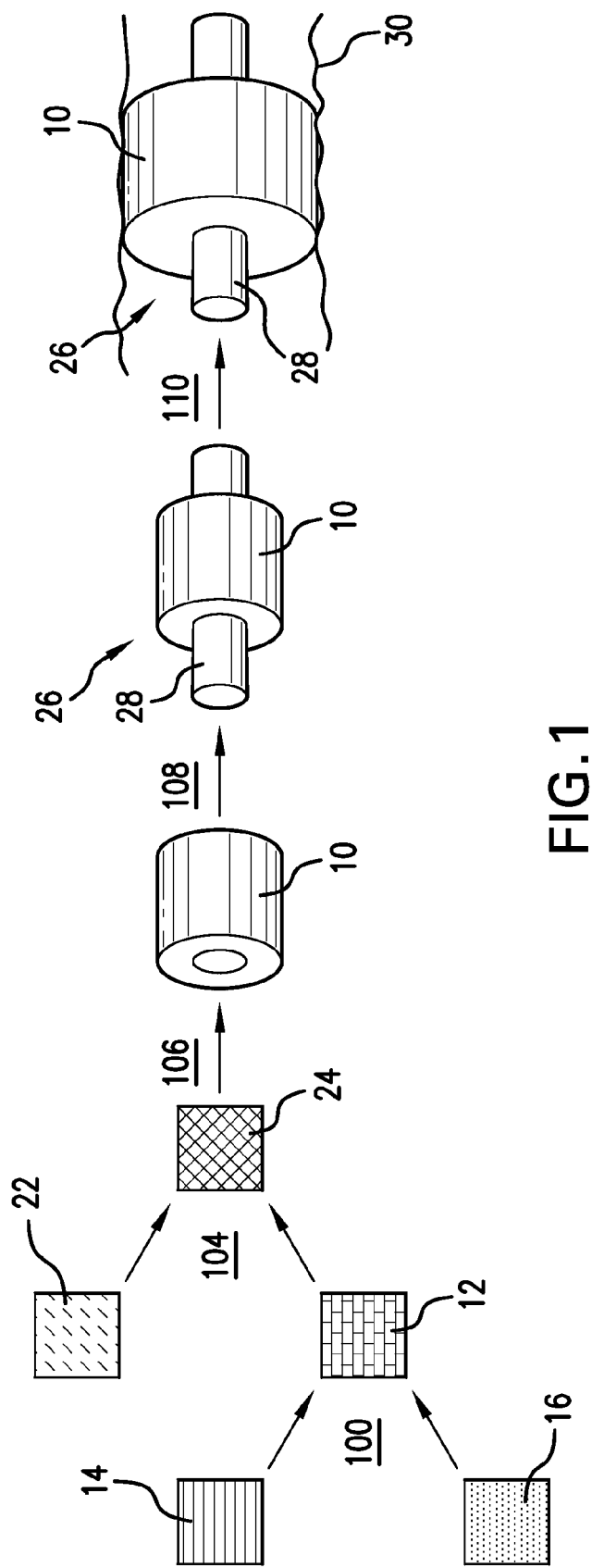
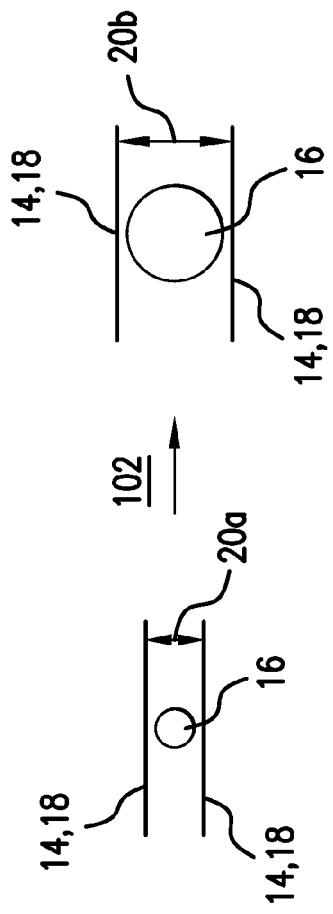
FIG. 1
FIG. 2

SWELLABLE ARTICLE

BACKGROUND

Fluid-swellable and fluid-absorbent materials are used in a variety of industries. For example, in the downhole drilling and completions industry, swellable materials are used for a variety of packer, isolation, actuation, and sealing devices that react automatically upon exposure to particular downhole fluids, such as oil and water. While these swellable materials are used satisfactorily for various purposes, the art nevertheless always well receives advances and alternatives to swellable and absorbent material systems.

SUMMARY

A swellable article, including a matrix material; and an exfoliatable graphene-based material disposed in the matrix material, wherein the exfoliatable graphene-based material is operatively arranged to facilitate swelling of the swellable article upon exposure to a selected fluid by sorbing particles in the fluid, the swelling enabling the swellable article to engage an adjacent structure.

A method of using a swellable article including exposing a swellable article according to the above to a selected fluid; swelling the swellable article with the selected fluid; sorbing particles in the fluid with the graphene-based material in order to facilitate the swelling; and engaging the swellable article with an adjacent structure after swelling.

A method of making a swellable article including disposing a graphene-based material in a matrix material to yield a swellable material; exfoliating the graphene-based material; and forming the swellable material into an article that is swellably responsive to a selected fluid, the graphene-based material operatively arranged to facilitate swelling of the swellable article upon exposure to a selected fluid by sorbing particles in the fluid.

BRIEF DESCRIPTION OF THE DRAWINGS

The following descriptions should not be considered limiting in any way. With reference to the accompanying drawings, like elements are numbered alike:

FIG. 1 schematically illustrates a process for making and using a swellable article; and FIG. 2 illustrates one example of exfoliating a graphene-based material of the article of FIG. 1 that includes expanding an intercallant.

DETAILED DESCRIPTION

A detailed description of one or more embodiments of the disclosed apparatus and method are presented herein by way of exemplification and not limitation with reference to the Figures.

Referring now to the drawings, a process for making and using a swellable article 10 is shown schematically in FIG. 1. The process to ultimately form the article 10 begins by creating an exfoliatable graphene-based material compound 12. By graphene-based material it is meant graphene, graphite, graphene oxide, graphite oxide, graphite intercalation compounds and their derivatized forms to include a functional group, e.g., including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. Graphite intercalation compounds can include intercalating agents such as, for example, an acid, metal, binary alloy of an alkali metal with mercury or thallium, binary compound of an alkali metal with a Group V element (e.g., P, As, Sb, and Bi), metal chalcogenide (including metal oxides such as, for example, chromium trioxide, $PbO_2$, $MnO_2$, metal sulfides, and metal selenides), metal peroxide, metal hyperoxide, metal hydride, metal hydroxide, metals coordinated by nitrogenous compounds, aromatic hydrocarbons (benzene, toluene), aliphatic hydrocarbons (methane, ethane, ethylene, acetylene, n-hexane) and their oxygen derivatives, halogen, fluoride, metal halide, nitrogenous compound, inorganic compound (e.g., trithiazyl trichloride, thionyl chloride), organometallic compound, oxidizing compound (e.g., peroxide, permanganate ion, chlorite ion, chlorate ion, perchlorate ion, hypochlorite ion, $As_2O_5$, $N_2O_5$, $CH_3ClO_4$, $(NH_4)_2S_2O_8$, chromate ion, dichromate ion), solvent, or a combination comprising at least one of the foregoing. Exemplary acids include nitric acid, sulfuric acid, acetic acid, $CF_3COOH$, $HSO_3F$, $HSO_3Cl$, $HSO_3CF_3$, persulfuric acid (e.g., $H_2SO_5$, $H_2S_2O_8$), phosphoric acid, $H_4P_2O_7$, perchloric acid, $H_3AsO_4$, $H_2SeO_4$, $HIO_4$, $H_5IO_6$, $HAuCl_4$, $H_2PtCl_6$, or a combination comprising at least one of the foregoing. Exemplary metals include alkali metals (e.g., lithium, sodium, potassium, and the like), alkaline earth metals (e.g., magnesium, calcium, strontium, and the like), rare earth metals (e.g., scandium, yttrium, lanthanide elements, and the like), transition metals (e.g., iron, tungsten, vanadium, nickel, and the like), and post-transition metals (e.g., aluminum, tin, and the like). Exemplary metal halides include NaI, $FeCl_3$, $CuCl_2$, $AuCl_3$, $MoCl_5$, $SbCl_5$, and the like. Nitrogenous compounds include, for example, ammonia, ammonium, hydrazines, amines, and amides. Exemplary halogens include $Cl_2$, $Br_2$, BrCl, ICl, IBr, $BrF_3$, $BrF_5$, and $IF_5$. Exemplary fluorides include halogen fluorides, boron fluoride, hydrogen fluoride, $PF_5$, $AsF_5$, and rare gas fluoride. Exemplary solvents include benzene, toluene, o-xylene, dimethyl sulfoxide, furan, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, benzyl benzoate, hexafluorobenzene, octafluorotoluene, pentafluorobenzonitrile, pentafluoropyridine, pyridine, dimethylformamide, hexamethylphosphoramide, nitromethane, and benzonitrile. These materials can be arranged in sheets, layers, or laminae, providing extremely high surface areas and oleophilicity. Advantageously, the combination of high surface area and oleophilicity enables these and other graphene-based materials to adsorb and/or absorb (collectively, "sorb") relatively large quantities of certain fluid particles, particularly oil, hydrocarbons, and other organic fluids. In turn, this sorption of large quantities of particles facilitates the swelling or increase of volume of the article 10 when exposed to a fluid have a component, e.g., oil or hydrocarbons, that is sorbed by the compound 12.

By exfoliatable it is meant that the graphene-based material is able to undergo an exfoliation process. Exfoliation as used herein refers to the creation of individual sheets, planes, layers, laminae, etc. (generally, "layers") of a graphene-based material; the delamination of the layers; or the enlargement of a planar gap between adjacent ones of the layers. In this way, the purpose of exfoliation is to increase the available surface area per unit volume or mass of the graphene-based material. This is particularly useful with respect to large fluid particles, e.g., as in heavy oil, which cannot fit between tightly packed layers. Examples of exfoliation include chemical, physical and/or mechanical processes such as heating of graphite intercalation compounds; sonication of graphite, graphite intercalation compounds and functionalized graphite in solvent systems; thermal annealing of graphite oxide; abrasion, shearing, stamping, or milling of graphite particles; removal of layers by adhesive tapes, etc., although those of ordinary skill in the art will appreciate that any other method now known or hereafter discovered can be used to exfoliate a graphene-based material.

In one embodiment, the compound 12 is formed by combining a graphene-based material 14 (i.e., as defined above) and an intercallant 16 according to a step 100. As shown in FIG. 2, the intercallant or intercalating agent 16 is a gaseous, liquid or solid material that is disposed between two layers 18 of the graphene-based material 14. In one embodiment, the intercallant 16 is formed by potassium and tetrahydrofuran, although other materials could be used. The layers 18 could be a single atom thick, or a plurality of atoms thick. The intercallant 16 results in a planar gap 20, initially designated with the numeral 20a, formed substantially perpendicularly between the layers 18. By heating the compound 12 according to a step 102, the intercallant 16 expands, thereby enlarging the gap 20 to a second size designated with the numeral 20b, during exfoliation of the compound 12. As will be described in more detail below, the step 102 is shown in its own FIG. 2 as the exfoliation of the graphene-based material could occur at various points during the process of FIG. 1. Further, those of ordinary skill in the art will readily appreciate that intercalation represents just one method of forming the exfoliatable compound 12 and that heating the intercallant 16 is just one example of exfoliating the compound 12 and that any other suitable exfoliatable compound and corresponding exfoliation method could be used.

Regardless of the method by which the compound 12 is formed, the compound 12 is combined with a matrix 22 in a step 104 in order to form a swellable material 24. In one embodiment, the compound 12 is milled (e.g., cryomilled) to form the compound 12 into a powder that is interspersed in the matrix 22. By swellable it is meant that the material 24 will swell, enlarge, or otherwise change in at least one direction when exposed to a suitable fluid. The matrix 22 could be a material that is also swellable, or a non-swellable material. In exemplary embodiments, the matrix material 22 is elastomeric, although other materials may be used depending on the ultimate purpose of the article 10. For example, in one embodiment, the matrix 22 is formed from acrylonitrile butadiene rubber, which provides good sealing characteristics and can be tailored to various degrees of swellability. In one embodiment, the matrix 22 and/or the swellable material 24 is prepared to include other additives or materials to tailor the properties of the resulting article 10, such as pressure rating, strength, swellability, pliability, durability, etc. In one embodiment, the matrix 22 and/or the material 24 includes carboxymethyl cellulose or some other water absorbent, water swelling, or hydrophilic additive in order to make the article 10 also swellable upon exposure to aqueous fluids. In this way, the article 10 can be made to be swellably responsive to oil, water, or dual-swellable combinations thereof.

The swellable material 24 is then formed in a step 106 into the article 10. The forming of the step 106 could including suitable molding, machining, shaping, or other process for giving a desired shape and dimensions to the article 10. In one embodiment, as noted previously herein, the swellable material 24 enables the article 10 to be swellably responsive to a fluid that is at least partially defined by oil or hydrocarbons, which are readily sorbed by the graphene-based material in the compound 12.

According to a step 108 of the illustrated embodiment, after forming the article 10 a system 26 is formed by disposing the article 10 with a tubular 28. In one embodiment, the material 24 is directly rolled onto the tubular to form the system 26 in a single step that combines the illustrated steps 106 and 108. In one embodiment, the tubular is part of a string, such as a production string, or some other component of a borehole completion. Of course, the article 10 could take any other shape for installation on or with non-tubular members, the article 10 could be radially inwardly installed as opposed to outwardly radially as shown, etc. Lastly, the article 10 is exposed to a suitable fluid in a step 110 in order to increase the volume of the article 10. In the illustrated embodiment, the swelling of the article 10 enables the article 10 to act to sealingly engage with a borehole 30 in order to isolate the borehole 30 on opposite sides of the article 10. Of course, the article 10 could be used in cased boreholes, or in any annulus formed between radially adjacent structures. Additionally, the swelling could be used for any combination of sealing, isolation, actuation, absorbing, etc., and one of ordinary skill in the art will recognize a myriad of isolation, packer, actuation, absorbing, and sealing devices that would benefit from the swellable materials and articles discussed herein.

As noted above, the step 102 could occur at various points in the general process of FIG. 1. For example, the graphene-based material could be exfoliated before, during, or after the steps 100, 104, 106, 108, or 110. It is noted that some of the benefits of exfoliating the graphene-based material could be negated during the forming in the step 106, particularly if the material 24 is compressed, e.g., in a mold, in order to form the article 10, as this may urge the graphene/graphite layers (e.g., the layers 18) closer together. In one embodiment utilizing the intercallant 16, the exfoliation illustrated in step 102 and FIG. 2 occurs after the article 10 is formed in the step 106 by heating the article 10. The heating could occur at surface, downhole, or any other desired location. In one embodiment, exposure to a downhole environment provides the heating necessary to exfoliate the graphene-based material by expanding the intercallant 16, while in other embodiments a heat source, such as a heated fluid, exothermic reaction, electrical current, etc. is provided. Advantageously, this enables the exfoliation to occur after all forming processes have occurred such that the graphite/graphene layers are not subjected to any processes that may urge them back together, thereby reducing the surface area that is accessible to particles (particularly relatively large particles) in the fluid to which the article 10 is responsive. In another embodiment, exfoliation of a graphite intercalation compound is achieved by passing an electric current through intercalated graphite or adjacent metallic components. In yet another embodiment, exfoliation of a graphite intercalation compound is achieved by inductive heating (e.g., producing eddy currents in the intercalated graphite/graphene particles). In yet another embodiment, exfoliation is achieved by applying ultrasonic frequencies to the graphene-based material. Without wishing to be bound by any particular theory, sonic frequencies may disrupt bonding between the adjacent atomic planes in graphene-based materials and/or induce chemical reactions of the intercalating agent within the galleries formed by graphene planes which result in the exfoliation of the graphene-based materials. Again without wishing to be bound by any particular theory, such effects may be induced by short-lived, localized disturbances (e.g., a hot spot) produced by the implosion of bubbles in the course of acoustic cavitation of the solvent. In yet another embodiment, exfoliation of graphite intercalation compounds is achieved by reacting the intercalating agent to increase the distance between the adjacent graphene planes in graphene-based materials. This can be achieved when the dimensions or occupied volumes of reaction products are larger than the dimensions or initial volumes of the intercalating agent, when a plurality of product molecules, atoms, or a combination thereof per molecule of the intercalating agent is produced, or when the formed reaction products have high kinetic energy (e.g., in order to heat the graphite intercalation compound and assist in exfoliation). For example, the intercalating agent could be hydrolyzed. In one embodiment, an antimony pentachloride intercalating agent is hydrolyzed upon contact with water molecules to produce $Sb_2O_5$ and hydrochloric acid. Any such product molecules or atoms can be further reacted to produce an even greater number of product molecules for assisting in the exfoliation process. Of course, any combination including any of the above could be utilized.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A swellable article, comprising:
   a matrix material;
   an exfoliatable graphene-based material disposed in the matrix material, wherein the exfoliatable graphene-based material is operatively arranged to expand upon application of ultrasonic frequencies to the graphene-based material and to facilitate swelling of the swellable article upon exposure to a selected fluid by sorbing hydrocarbons in the fluid, the swelling enabling the swellable article to engage an adjacent structure, and
   an intercallant disposed between layers of the graphene-based material; and
   wherein the intercallant is one or more of the following:
   a metal selected from an alkali metal, alkaline earth metal, rare earth metal, transition metal, and post-transition metal;
   a binary alloy of an alkali metal with mercury or thallium;
   a binary compound of an alkali metal with a Group V element;
   a metal chalcogenide comprising a metal oxide; a metal sulfide; a metal selenide; or a combination thereof
   a metal peroxide;
   a metal hyperoxide;
   a metal hydride;
   a metal coordinated by a nitrogenous compound;
   a halogen comprising $Cl_2$, $Br_2$, BrCl, ICl, IBr, $BrF_3$, $BrF_5$, $IF_5$, or a combination thereof;
   an acid comprising $CF_3COOH$, $HSO_3F$, $HSO_3Cl$, $HSO_3CF_3$, $H_2S_2O_8$, phosphoric acid, $H_4P_2O_7$, $H_3AsO_4$, $H_2SeO_4$, $HIO_4$, $H_5IO_6$, $HAuCl_4$, $H_2PtCl_6$, or a combination thereof; or a combination thereof;
   an oxidant comprising a permanganate ion, a chlorite ion, a chlorate ion, a perchlorate ion, a hypochlorite ion, a chromate ion, a dichromate ion; or a combination thereof; or
   a solvent comprising benzene, toluene, o-xylene, dimethyl sulfoxide, furan, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, benzyl benzoate, hexafluorobenzene, octafluorotoluene, pentafluorobenzonitrile, pentafluoropyridine, pyridine, dimethylformamide, hexamethylphosphoramide, nitromethane, and benzonitrile, or a combination thereof.

2. The swellable article of claim 1, wherein the matrix material is an elastomeric material.

3. The swellable article of claim 2, wherein the swellable article is operatively arranged to create a sealed engagement with the structure after swelling.

4. The swellable article of claim 3, wherein the structure is a borehole, tubular, or a combination including at least one of the foregoing.

5. The swellable article of claim 1, wherein the swellable article is configured to swell in a radial direction.

6. The swellable article of claim 1, wherein the intercallant is operatively arranged to expand upon application of heat to the intercallant in order to exfoliate the graphene-based material.

7. The swellable article of claim 1, wherein the intercallant is operatively arranged to react with water in order to exfoliate the graphene-based material.

8. A method of making a swellable article of claim 1 comprising:
   disposing a graphene-based material in a matrix material to yield a swellable material;
   exfoliating the graphene-based material; and
   forming the swellable material into an article that is swellably responsive to a selected fluid, the graphene-based material operatively arranged to expand upon application of ultrasonic frequencies to the graphene-based material and to facilitate swelling of the swellable article upon exposure to a selected fluid by sorbing hydrocarbons in the fluid
   wherein the graphene-based material comprises an intercallant disposed between layers of the graphene-based material; and
   wherein the intercallant is one or more of the following:
   a metal selected from an alkali metal, alkaline earth metal, rare earth metal, transition metal, and post-transition metal;
   a binary alloy of an alkali metal with mercury or thallium;
   a binary compound of an alkali metal with a Group V element;
   a metal chalcogenide comprising a metal oxide; a metal sulfide; a metal selenide; or a combination thereof
   a metal peroxide;
   a metal hyperoxide;
   a metal hydride;
   a metal coordinated by a nitrogenous compound;
   a halogen comprising $Cl_2$, $Br_2$, BrCl, ICl, IBr, $BrF_3$, $BrF_5$, and $IF_5$, or a combination thereof;
   an acid comprising $CF_3COOH$, $HSO_3F$, $HSO_3Cl$, $HSO_3CF_3$, $H_2S_2O_8$, phosphoric acid, $H_4P_2O_7$, $H_3AsO_4$, $H_2SeO_4$, $HIO_4$, $H_5IO_6$, $HAuCl_4$, $H_2PtCl_6$, or a combination thereof; or a combination thereof;

an oxidant comprising a permanganate ion, a chlorite ion, a chlorate ion, a perchlorate ion, a hypochlorite ion, a chromate ion, a dichromate ion, or a combination thereof; or a solvent comprising benzene, toluene, o-xylene, dimethyl sulfoxide, furan, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, benzyl benzoate, hexafluorobenzene, octafluorotoluene, pentafluorobenzonitrile, pentafluoropyridine, pyridine, dimethylformamide, hexamethylphosphoramide, nitromethane, and benzonitrile, or a combination thereof.

9. The method of claim 8, wherein exfoliating includes heating the graphene-based material in order to expand an intercallant disposed between layers of the graphene-based material.

10. The method of claim 8, wherein heating includes: running current through the graphene-based material, the article, a structure adjacent the article, or a combination including at least one of the foregoing; triggering an exothermic reaction; positioning the article in a downhole location; delivering a heated fluid to the article; inducing eddy currents in the graphene-based material; or a combination including at least one of the foregoing.

11. The method of claim 8, wherein exfoliating includes reacting an intercallant disposed between layers of the graphene-based material.

12. The method of claim 11, wherein reacting the intercallant includes producing a plurality of product molecules, atoms, or a combination thereof, per molecule of the intercallant.

13. The method of claim 12, wherein producing the plurality of product molecules, atoms, or the combination thereof, includes reacting the plurality of product molecules, atoms, or the combination thereof to form at least one additional product molecule or atom.

14. The method of claim 11, wherein reacting the intercallant includes hydrolyzing the intercallant.

15. The method of claim 8, wherein exfoliating includes applying sonic frequencies to the graphene-based material in order to expand an intercallant disposed between layers of the graphene-based material.

16. The method of claim 8, wherein the matrix material is an elastomeric material.

17. The method of claim 8, wherein exfoliating occurs before disposing the graphene-based material in the matrix material.

18. The method of claim 8, wherein exfoliating occurs before forming the swellable material into the article.

19. The method of claim 8, wherein exfoliating occurs after forming the swellable material in the article.

20. The method of claim 19, wherein exfoliating occurs after positioning the article downhole.

21. A method of using a swellable article comprising:
exposing a swellable article according to claim 1 to a selected fluid;
swelling the swellable article with the selected fluid;
sorbing particles in the fluid with the graphene-based material in order to facilitate the swelling; and
engaging the swellable article with an adjacent structure after swelling.

22. The method of claim 21, wherein the particles are hydrocarbons.

23. The method of claim 21, wherein the swellable article forms a sealed engagement with the adjacent structure.

24. The method of claim 21, wherein the adjacent structure is a borehole, tubular, string, or a combination including at least one of the foregoing.

25. The method of claim 21, wherein swelling the swellable article includes radially expanding the swellable article.

26. The swellable article of claim 1, wherein exfoliatable graphene-based material is derivatized with a functional group comprising carboxy, epoxy, ether, ketone, amine, hydroxy, alkoxy, alkyl, aryl, aralkyl, alkaryl, lactone, functionalized polymeric or oligomeric group, or a combination comprising at least one of the foregoing.

27. The swellable article of claim 1, wherein the intercallant is one or more of the following: an alkali metal; or an alkaline earth metal.

28. The swellable article of claim 1, wherein the intercallant is one or more of the following: a binary alloy of an alkali metal with mercury or thallium; or a binary compound of an alkali metal with a Group V element.

29. The swellable article of claim 1, wherein the intercallant is one or more of the following: a metal oxide, a metal sulfide; a metal selenide; a metal peroxide, a metal hyperoxide, or a metal hydride.

30. The swellable article of claim 1, wherein the intercallant is a metal coordinated by a nitrogenous compound.

31. A swellable article, comprising:
a matrix material;
an exfoliatable graphene-based material disposed in the matrix material, wherein the exfoliatable graphene-based material is operatively arranged to expand upon application of ultrasonic frequencies to the graphene-based material and to facilitate swelling of the swellable article upon exposure to a selected fluid by sorbing hydrocarbons in the fluid, the swelling enabling the swellable article to engage an adjacent structure, and
an intercallant disposed between layers of the graphene-based material; and
wherein the intercallant is one or more of the following:
a halogen comprising $Br_2$;
a metal selected from an alkali metal or an alkaline earth metal;
a binary alloy of an alkali metal with mercury or thallium;
a binary compound of an alkali metal with a Group V element; or
a metal coordinated by a nitrogenous compound.

\* \* \* \* \*